June 10, 1958  J. M. WEST ET AL  2,838,452
PLATES WITH OXIDE INSERTS
Filed Sept. 28, 1956
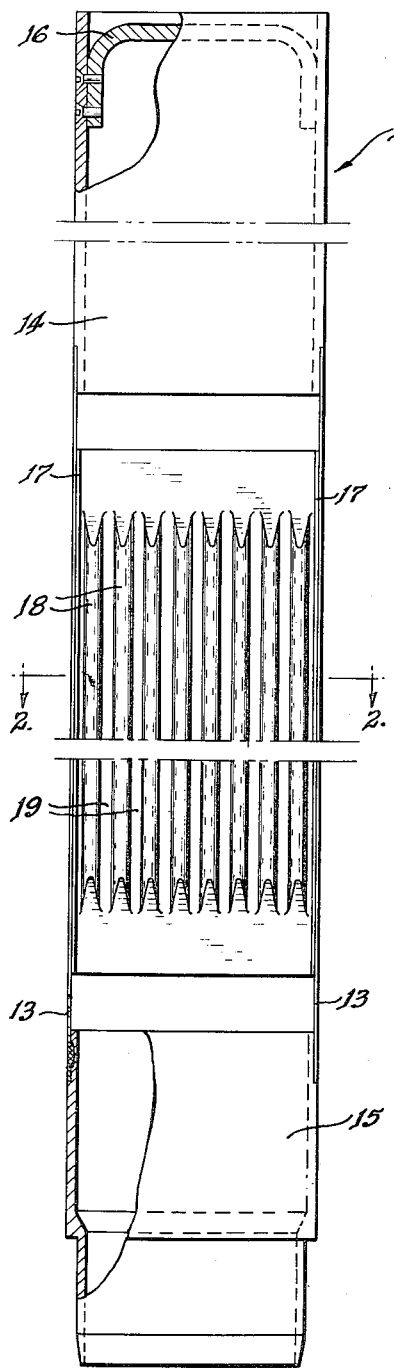
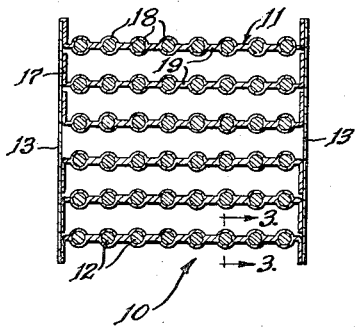
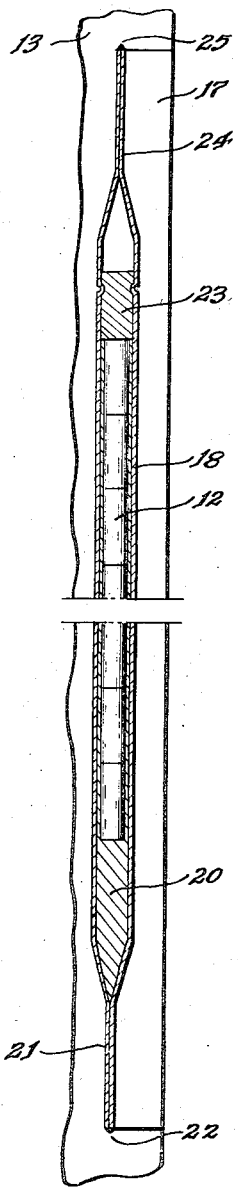
INVENTORS
John M. West
James F. Schumar
By: Roland A. Anderson
Attorney United States Patent Office 2,838,452
Patented June 10, 1958

2,838,452

PLATES WITH OXIDE INSERTS

John M. West, Downers Grove, and James F. Schumar, Hinsdale, Ill., assignors to the United States of America as represented by the United States Atomic Energy Commission Application September 28, 1956, Serial No. 612,906

3 Claims. (Cl. 204—193.2)

This invention relates to a nuclear reactor employing fuel in oxide form and more particularly, to a reactor in which round cylindrical fuel elements are housed in a planar or plate-like construction.

It is advantageous to use nuclear fuel in oxide form in reactors of high power density, such as those in which water is heated to produce steam and also serves as a moderator, because the oxide is heat-resistant, easy to process after being used up, does not undergo substantial radiation growth, and will not rupture the fuel element if water leaks in in the event of a jacket break.

Fuel elements of oxides, more particularly thoria with a small amount of urania, should take the form of round cylindrical pellets, because the poor heat conductivity of the oxides causes a fuel-element shape other than round to give concentrated thermal stresses and because the oxides, existing in powder form, can be conveniently transformed into fuel elements only by being compressed into round cylindrical pellets. Since the poor heat conductivity of the oxides requires a small diameter for these pellets, the individual tubes that in the past have been used to house these pellets are small in diameter and somewhat weak structurally so as to require support at various regions along their lengths. If these tubes are supported one against the other, the spaces between them are restricted in size and so accommodate only a limited coolant flow over the tubes.

If the tubes containing fuel elements are supported other than directly against one another, the separate supporting structures cut down the amount of fuel possible for a given size of reactor, are expensive to fabricate, create hot spots in the reactor, and absorb neutrons parasitically.

According to our invention, oxide fuel pellets are positioned in rows of passages in plates that are easily attached to one another in spaced relationship so that a strong structure is provided in which spaces between plates are ample for the flow of fluid in heat exchange with the fuel pellets. The fuel pellets are thermally bonded to the passages in the plates by a lead filler, which dispenses with the need to finish the passages and pellets to exact size. Thus the structure is cheap and easy to produce.

In the drawings:

Fig. 1 is an elevational view, partly in section, of the novel fuel-element assembly of the present invention;

Fig. 2 is a transverse sectional view taken on the line 2—2 of Fig. 1 and showing the arrangement of fuel elements and plates of the assembly; and Fig. 3 is a longitudinal sectional view taken on the line 3—3 of Fig. 2 showing the arrangement of a column of fuel elements in a single passage of a plate.

An assembly 10 of the present invention comprises plates 11, fuel pellets 12 in the plates, side members 13 interconnecting and holding the plates 11 in spaced relationship, an upper bracket 14, a lower bracket 15, and a handle 16.

Each plate 11 may be of an alloy composed of 1% Ni, .4–.5% Fe, .1–.2% Si, .1–.2% Cu, and the balance Al and may be formed by extrusion into a shape like that shown except that flanges 17 at the side edges are originally extruded in the general plane of the plate. Each plate 11 as extruded has tubular portions 18 and connecting regions 19. The tubular portions 18 extend longitudinally of the plate 11 and are parallel to and spaced from one another by the connecting regions 19. The thickness of the plate 11 at the connecting regions 19 is less than that at the tubular portions 18, i. e., the outer diameter of the tubular portions. The thickness of each connecting region 19 is .0875". Each tubular portion 18 has an inner diameter of .256" and an outer diameter of .2965". Each plate 11 has 8 tubular portions 18 which have center-to-center spacings of .468". The assembly 10 has six plates 11 which have center-to-center spacings of .604". The outside transverse dimensions of the assembly 10 is 3.875" across the side members 13 and 3.828" along the side members.

Each tubular portion 18 contains a plurality of ceramic fuel pellets 12 formed of a mixture of $ThO_2$ and $UO_2$ highly enriched in U–235 so that there is .0555 g. U–235 per g. $ThO_2$. Each fuel pellet 12 has 90% theoretical density and a diameter of .225". In each tubular portion 18 the pellets 12 are laid end to end so as to have combined length of 24.75". Since the inner diameter of the tubular portion 18 is .256", there is a space around each pellet 12 of .0155", which is filled with a lead layer serving as a thermal bond between the tubular portion and the fuel pellet. Lead as indicated at 20 in Fig. 3 also fills the space between the lowest fuel pellet 12 and a lower end 21 of the tubular portion 18 which is squeezed shut and closed in a soldered or welded joint 22. An aluminum plug 23 of the same composition as the plate 11 is positioned in each tubular portion 18 at the top of the column of fuel pellets 12 and is mechanically connected to the interior of the tubular portion 18 so as to hold down the column of fuel pellets 12 and prevent them from floating in the lead in the tubular portion 18 when the lead becomes molten during use of the nuclear reactor. Each tubular portion 18 has an upper end 24 which is squeezed shut and closed in a soldered or welded joint 25. The plug 23 has a diameter of .2425" and a length of .5".

The advantages in the use of the lead bond between the fuel pellets 12 and the tubular portions 18 are that the pellets and the interior of the tubular portions need not be finished to precise dimensions and that the need for swaging down the tubular portions on the pellets is eliminated. Thus manufacturing costs are kept low.

There are 72 assemblies 10 placed in parallel side-by-side relationship so that in cross section they generally fill a circle of a 40" diameter. Around these 72 assemblies there is a water reflector 6" thick. The 72 assemblies are to contain 25.05 kg. U–235. It is contemplated that water under pressure is to be flowed lengthwise of the assemblies 10 for abstracting heat therefrom and being converted to steam. Reference is made to Untermyer application Serial No. 518,427, filed June 28, 1955, for a more complete description of details of construction and operation of a reactor of this sort. Reference is also made for more complete details to Geneva Report on Peaceful Uses of Atomic Energy, vol. III, page 57, an article entitled "Design and Operating Experience of a Prototype Boiling Water Power Reactor," by Dietrich, Lichtenberger, and Zinn.

It is also understood that the invention is not to be limited by the details given herein but that it may be modified within the scope of the appended claims.

What is claimed is:

1. An assembly comprising a plurality of aluminum plates, means attached to side edges of the plates for holding them in parallel spaced side-by-side relationship, each plate having a plurality of parallel spaced longitudinal cylindrical openings, cylindrical nuclear-fuel elements of thoria and urania positioned in said openings, and lead contained in the openings in the plates to provide thermal bonds between the fuel elements and the plates.

2. The assembly specified in claim 1, the thickness of each plate being greater at each of its openings than at the region between openings.

3. The assembly specified in claim 2, each fuel element containing .0555 g. of U–235 per g. of thoria.

References Cited in the file of this patent

UNITED STATES PATENTS

| 29,276 | Holmes | July 24, 1860 |
| 2,705,616 | Watson | Apr. 5, 1955 |

OTHER REFERENCES

Proceedings of the International Conference on The Peaceful Uses of Atomic Energy, vol. 9, pp. 182 and 203–207, Geneva, August 8–20, 1955, published 1956 by United Nations, New York.